Figure 1:
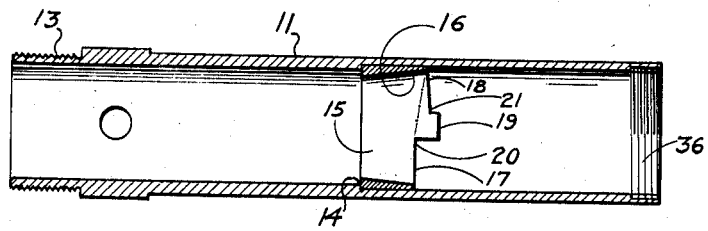

June 29, 1943.  S. B. MARTIN  2,323,067

PUSHER

Filed April 8, 1941

INVENTOR.
STODDARD B. MARTIN
BY Richey & Watts
ATTORNEYS.

Patented June 29, 1943

2,323,067

UNITED STATES PATENT OFFICE 2,323,067

PUSHER

Stoddard B. Martin, Lakewood, Ohio

Application April 8, 1941, Serial No. 387,476

14 Claims. (Cl. 29—62)

This invention relates to stock pushers for automatic screw machines.

Each spindle of an automatic screw machine ordinarily includes a rotating collet tube having a collet at its forward end which is arranged to be compressed radially to grip and rotate a bar of stock fed axially through the collet tube. At the end of each cycle of operations of the machine, the projecting end of stock is cut off from the bar, the collet opens, a new length of stock is fed forwardly, and the collet is again closed to grip the stock and repeat the cycle of operations. The stock is ordinarily fed forward by a pusher carried by a reciprocating pusher tube arranged between and co-axial with the collet tube and the stock.

In the conventional machine the pusher is simply a spring bushing, exerting a constant grip on the bar, which is moved forwardly after the collet opens until the forward end of the bar strikes a stock gauge. The collet then closes and the pusher is retracted while the bar is gripped by the collet. One of the disadvantages of this arrangement is that when the pusher is given a sufficiently tight grip on the bar to insure accurate feeding and prevent rebounding when the bar strikes the gauge, there is danger of scratching and scoring the stock when the pusher is retracted.

To avoid this disadvantage, it has been proposed to provide one-way grippers which by a wedging or similar action grip the bar tightly on the forward feeding stroke, and release it, or grip it but lightly, on the return stroke. It is, however, occasionally necessary to withdraw a bar from the machine, and to permit this, means must be provided to prevent the wedging action or tight gripping of the bar when desired.

Pushers for accomplishing these results are disclosed and claimed in my prior Patents Nos. 2,088,067, 2,169,107, 2,187,089, and 2,187,090. The present invention is an improvement in this general type of pusher and has for its principal object the arranging of the means for preventing the wedging or tight gripping action of the pusher in such a manner that it cannot be injured or jammed in the normal use of the pusher, and yet is instantly available to permit the withdrawal of the stock whenever desired.

Other objects are to permit release of the wedging or tight gripping action of the pusher by simply rotating the bar in the direction opposite to that in which it is normally driven by the machine; to distribute the total gripping pressure over a substantial area so as to eliminate the danger of either slippage of the feed or scoring of the stock; to prevent the means for releasing the wedging action from escaping from its proper position when a new bar is being inserted or when the machine is operated without stock; and generally to simplify, reduce the cost, and improve the efficiency of pushers of this type.

In the accompanying drawing which illustrates one embodiment of this invention—

Figure 2:
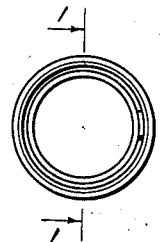
Figure 4:
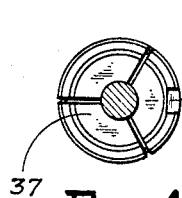
Figure 3:
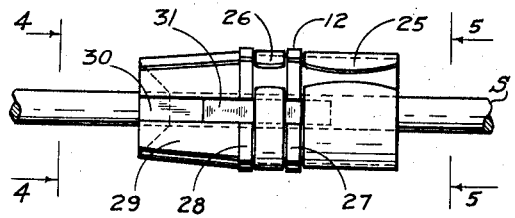
Figure 5:
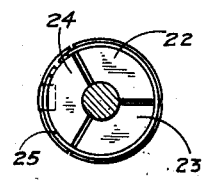
Figure 6:
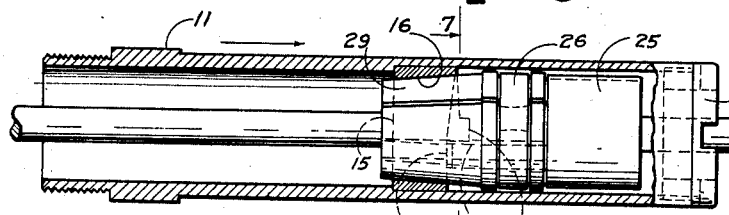
Figure 7:
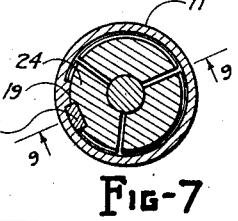
Figure 8:
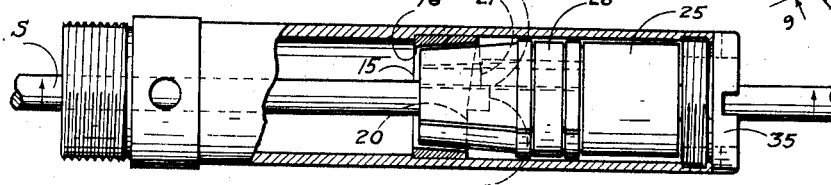
Figure 9:
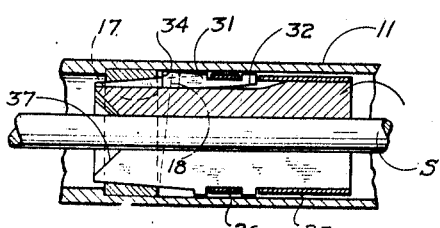
Figure 10:
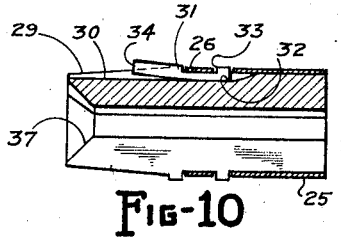

Figure 1 is a longitudinal section through the shell of the pusher taken on the line 1—1 of Figure 2, Figure 2 is an end view of the shell, Figure 3 is an elevation of the bushing removed from the shell showing a bar of stock in place, Figure 4 is an end view of the bushing looking in the direction of the arrows 4—4 of Figure 3, Figure 5 is an end view of the bushing looking in the direction of the arrows 5—5 of Figure 3, Figure 6 is a longitudinal section of the shell, bushing and stock in assembled relation showing the bushing gripping the stock tightly for advancing the same, Figure 7 is a section taken on the line 7—7 of Figure 6, Figure 8 is a longitudinal section corresponding to Figure 6 but showing the bushing in position to permit withdrawal of the stock, Figure 9 is a section through the shell and bushing taken on the line 9—9 of Figure 7, Figure 10 is a similar section through the bushing showing the same removed from the shell and with the stock removed from the bushing.

Referring to the drawing the pusher of this invention comprises generally a shell 11 and a bushing 12. The shell 11 is provided at its rear end with a reduced threaded portion 13 to screw into the pusher tube. The shell is provided interiorly with a shoulder 14 at the intersection of bores of different diameter against which is positioned a sleeve 15, which may be driven in from the forward end of the shell, and which is preferably spot welded in position against the shoulder 14. The central opening of the sleeve 15 is formed as a tapered wedging surface 16, and the forward edge of the sleeve is formed as a cam surface 17. Through about half of its circumference the cam 17 lies in a plane perpendicular to the axis of the shell, this being the lower half of the cam surface 17 as shown in Figure 1. Through the remainder of the circumference the cam surface spirals forwardly, as indicated at 18, terminating in a forwardly projecting lug 19. Thus a deep seat 20 is formed on one side of the lug at its junction with the cam surface 17, and a shallow seat 21 is similarly formed on the opposite side of the lug 19.

The bushing 12 preferably comprises three mating sections 22, 23 and 24 which are held together and urged radially inward upon the stock S by annular springs 25 and 26. Each of the sections 22, 23 and 24 is formed with aligned segments 27 and 28 which in the assembled bushing form ribs or flanges projecting radially outward from the bushing and receiving between them the spring 26. Each of the segments 22, 23 and 24 is formed with a segmental conical wedging surface 29 at its rear end. The surfaces 29 in the assembled bushing taper rearwardly so as to fit within the wedging surface 16 in the sleeve 15.

The section 24 is further provided with a milled slot 30 extending through the ribs 27 and 28 and forming a seat for a rocking key 31. The key 31, as illustrated in Figures 9 and 10, is formed on its underside with a curved surface 32 which rests against the bottom of the slot 30. On its upper surface the key is provided with a notch 33 which receives the spring 26. At its rearward end the key is formed with an abutment corner 34 which projects radially beyond the tapered surface 29.

The bushing 12 is assembled within the shell 11 as illustrated in Figures 6 and 8. A nut 35 formed with a hole to permit passage of the stock S is screwed into the threads 36 at the forward end of the shell to hold the bushing assembled within the shell. The abutment corner 34 of the rocking key 31 is directed towards the cam surface 17 of the sleeve 15.

In the usual machine of this type the collet is arranged to be driven in a clockwise direction as viewed from the rear end of the spindle, or from the left hand end of the pusher tube as shown in Figures 1, 6 and 8. The pusher tube is mounted for free rotation and is thus driven in the same direction by the stock when the stock is gripped by the collet. Thus the bushing 12, which is gripped upon the stock by the force of the springs 25 and 26, is normally driven in a clockwise direction to bring the side of the key 31 against the projecting lug 19 on the sleeve 15 so that the key is positioned in the deep seat 20 formed by the cam surface 17. The lug 19 is made of sufficient length with respect to the length of the bushing and the location of the nut 35 to prevent the bushing from making a complete revolution within the shell.

Thus in normal operation of the machine the key 31 is positioned against the lug 19 in the seat 20 in the relation shown in Figure 6. When the pusher tube is advanced in the direction shown by the arrow in Figure 6 the conical surface 16 of the sleeve 15 engages the complemental surfaces 29 on the bushing 12, wedges the bushing against the stock, and feeds the desired length of stock forwardly through the collet. When the pusher shell 11 is retracted into position for its next feeding movement the shell 11 slides rearwardly over the bushing 12, releasing the wedging grip provided by the engagement of the tapered surfaces 16 and 29, until the nut 35 engages the forward end of the bushing, after which the bushing is moved rearwardly with the shell. During this rearward movement the bushing grips the stock S solely with the force of springs 25 and 26.

The magnitude of the gripping force exerted by the wedging action of the surfaces 16 and 29 is dependent upon the angle of the surfaces and the resistance to movement offered by the bushing. When a long bar of substantial mass is being fed, the inertia of the bar is sufficient to cause slippage if the springs alone were depended upon for the gripping force. When the feeding movement of the shell 11 starts, the wedging surfaces engage and transmit the driving force to the bushing. The force required to slip the bushing on the bar is available to wedge the surfaces 16 and 29 together, and the additional gripping pressure thus provided prevents slippage of the bushing. After the bar has started, the wedging surfaces remain in tight engagement and prevent rebounding of the bar through the pusher when the forward end of the bar strikes the stock gauge.

It is found that with a spring pressure on the bushing low enough to insure against scoring or marring of the bar when the bushing slides over it, an angle of about three degrees on the wedging surfaces provides ample gripping pressure to start, and prevent rebounding of, the longest bars used in machines of this type.

As the bar being fed is used up, its inertia decreases, until the gripping pressure provided by the springs becomes sufficient to effect the feeding. Thus the tension of the spring 25 is sufficient to feed the final end of a bar which may be gripped only by the extreme forward end of the bushing. Since the forward end of the bushing is quite close to the end of the pusher, the waste from lost stock is diminished.

The arrangement of the springs 25 and 26 along the sections 22, 23, and 24 in advance of the wedging surfaces 29 permits the distribution of the gripping pressures over a substantial area of the bar, reducing the unit pressure and further reducing the possibility of scoring. At the same time the spring 25 is sufficient to effect feeding of a short end gripped only by the extreme forward end of the bushing, so that the increased length of the bushing does not result in increased waste of stock.

It is occasionally desired to withdraw the stock S from the machine before the entire bar has been used. With the parts in their normal operating position as shown in Figure 6 the stock cannot be withdrawn because the rearward movement of the bar forces the tapered surfaces 29 and 16 together so that the bar is tightly gripped within the bushing. To permit such withdrawal a bar of stock is simply rotated in a counterclockwise direction from the rear end of the machine so that the abutment end 34 of the key 31 is moved to the opposite side of the lug 19 and seats in the relatively shallow seat 21. The parts are then in the position illustrated in Figure 8, the engagement of the key 34 in the seat 21 holding the tapered surfaces 29 forwardly out of engagement with the tapered surface 16 of the shell. In this position the stock can be readily withdrawn through the bushing.

The rocking key 31 is urged radially upward by the tension of the spring 26 as shown in Figure 10. When stock is in position in the bushing the abutment end 34 of the key is pressed inwardly by engagement with the inner surface of the shell 11 as shown in Figure 9. When the stock is withdrawn from the pusher the sections 22, 23 and 24 collapse together under the force of the springs 25 and 26, increasing the clearance between the bushing and the shell and permitting the end 34 of the rocking key 31 to move radially outward to substantially the position shown in Figure 10. Thus the end 34 of the key 31 remains at all times in engagement with the inner surface of the shell 11 regardless of whether the bushing 12 is expanded or collapsed, so that the key is at all times in position to engage the cam surface 17. The rear end of the bushing is preferably provided with tapered surfaces 37 converging into the central opening through the bushing so that when the bushing is collapsed the end of a new bar may be readily pushed into place by engaging the tapered surfaces 37 and spreading the sections 22, 23 and 24.

When a new bar is forced into the bushing, the bushing is first moved forward into contact with the nut 35 which abuts the front face of the bushing and prevents further movement of the same within the sleeve. Thus there is no possibility of jamming the key 31 or injuring the same or the wedging surfaces, even if a careless workman should slam or drive the bar into position with excessive force. The arrangement of the key 31 at the rear end of the bushing, with a separate means to restrict the forward movement of the bushing with respect to the sleeve, thus prevents the abutting end 34 of the key from being damaged by the insertion of a new bar, and from being worn by the pull back force exerted by the sleeve on the bushing during the retracting movement of the pusher.

With this arrangement a pusher mechanism is provided which has a constant relatively light spring grip upon the stock with increasing relatively positive grip when the pusher is advanced to feed the stock forwardly. At the same time withdrawal of the bar is possible at any time by simply rotating the same to the left, or in a direction opposite to that in which it is driven by the machine, so as to prevent the tapered surfaces from contacting and providing the increased gripping pressure. During operation of the machine the tapered surfaces are at all times in position to engage and grip by reason of the righthand or clockwise rotation imparted to the bar, and thus to the bushing, by the collet of the machine. At the same time all danger of the abutment key 34 escaping past the cam surface 17 when the bushing is collapsed is avoided by the rocking action of the key 31.

Although I have described and illustrated a preferred embodiment of my invention it will be understood that various modifications and reversals and rearrangements of parts may be resorted to without departing from the scope of the invention as defined in the following claims.

I claim:

1. In a pusher for automatic screw machines and the like, a pusher shell, a bushing within the shell arranged to resiliently grip the stock to be fed, cooperating wedging surfaces on the shell and bushing arranged to engage and increase the grip of the bushing on the stock when the shell moves forwardly, cooperating abutment surfaces on the shell and bushing arranged to engage and slide the bushing over the stock when the shell moves rearwardly, and abutments on the shell and bushing located adjacent the rearward end of the bushing adapted to be brought into engagement when desired by rotation of said bushing in said shell and operable to prevent engagement of said wedging surfaces.

2. In a pusher for automatic screw machines and the like, a pusher shell, a bushing within the shell arranged to resiliently grip the stock to be fed, cooperating wedging surfaces on the shell and bushing arranged to engage and increase the grip of the bushing on the stock when the shell moves forwardly, cooperating abutment surfaces on the shell and bushing arranged to engage and slide the bushing over the stock when the shell moves rearwardly, and a cam abutment on the shell and a cooperating key on the bushing adapted to be brought into engagement by rotation of said bushing in said shell, said cam and key operable by further rotation to force said wedging surfaces out of engagement.

3. In a pusher for automatic screw machines and the like, a pusher shell, a bushing within the shell arranged to resiliently grip the stock to be fed, cooperating wedging surfaces on the shell and bushing arranged to engage and increase the grip of the bushing on the stock when the shell moves forwardly, cooperating abutment surfaces on the shell and bushing arranged to engage and slide the bushing over the stock when the shell moves rearwardly, a forwardly facing abutment on said shell, a key having a rearwardly facing abutment mounted on said bushing, and means resiliently urging said key radially outward, said key being adapted to be brought into engagement with said forwardly facing abutment to prevent engagement of said wedging surfaces.

4. In a pusher for automatic screw machines and the like, a pusher shell, a bushing within the shell arranged to resiliently grip the stock to be fed, cooperating wedging surfaces on the shell and bushing arranged to engage and increase the grip of the bushing on the stock when the shell moves forwardly, cooperating abutment surfaces on the shell and bushing arranged to engage and slide the bushing over the stock when the shell moves rearwardly, a forwardly facing abutment on said shell, a key having a rearwardly facing abutment mounted on the side of said bushing, and means resiliently urging said key radially outward into position for full engagement with said forwardly facing abutment, the rearwardly facing abutment of said key being adapted to be brought into engagement with said forwardly facing abutment by rotation of said bushing in said shell to prevent engagement of said wedging surfaces.

5. In a pusher for feeding stock, a shell, a bushing within the shell arranged to resiliently grip the stock to be fed, cooperating wedging surfaces on the bushing and shell arranged to engage and increase the grip of the bushing on the stock when the shell moves forwardly, a key rockably mounted on said bushing, means resiliently urging said key radially outward, a cam on said shell, said cam and key being out of contact when said bushing is in normal operating position in said shell and arranged to engage and to force and hold said wedging surfaces out of engagement when said bushing is rotated in one direction with respect to said shell.

6. In a pusher for feeding stock, a shell, a bushing within the shell arranged to resiliently grip the stock to be fed, cooperating wedging surfaces on the bushing and shell arranged to engage and increase the grip of the bushing on the stock when the shell moves forwardly with respect to the bushing, cooperating abutment surfaces on the shell and bushing arranged to engage and slide the bushing over the stock when the shell moves rearwardly with respect to the bushing, a key on said bushing having its rear end and one side formed as abutment surfaces, a laterally facing abutment surface on said shell arranged to engage the side of said key when said bushing is rotated in one direction to prevent further relative rotation of said bushing and said shell, said bushing being free to move rearwardly with respect to said shell to affect engagement of said wedging surfaces when said laterally facing abutment is engaged with the side of said key, and a forwardly facing abutment on said shell arranged to engage the rear end of said key and hold said wedging surfaces out of engagement when said bushing is rotated in the opposite direction.

7. In a pusher for feeding stock, a shell, a bushing within the shell arranged to resiliently grip the stock to be fed, cooperating wedging surfaces on the bushing and shell arranged to engage and increase the grip of the bushing on the stock when the shell moves forwardly with respect to the bushing, cooperating abutment surfaces on the shell and bushing arranged to engage and slide the bushing over the stock when the shell moves rearwardly with respect to the bushing, a cam on said shell having a forwardly facing cam surface, a lug on said shell projecting forwardly from said cam surface, and a key on said bushing arranged to engage one side of said lug when said bushing is rotated in one direction and prevent further relative rotation of said bushing and said shell, in said position said bushing being free to move rearwardly with respect to said shell to effect engagement of said wedging surfaces, said key being arranged to engage said cam and hold said wedging surfaces out of engagement when said bushing is rotated in the opposite direction.

8. In a pusher for feeding stock, a shell, a bushing within the shell arranged to resiliently grip the stock to be fed, cooperating wedging surfaces on the bushing and shell arranged to engage and increase the grip of the bushing on the stock when the shell moves forwardly with respect to the bushing, cooperating abutment surfaces on the shell and bushing arranged to engage and slide the bushing over the stock when the shell moves rearwardly with respect to the bushing, a key projecting radially from said bushing having its sides and its rear end formed as abutment surfaces, laterally facing spaced abutments on said shell arranged to engage the sides of said key and limit relative rotation of said bushing and said shell, a forwardly facing abutment in said shell arranged to engage the rear end of said key and hold said wedging surfaces out of engagement when said key is in contact with one of said laterally facing abutments, said bushing being free to move rearwardly with respect to said shell to effect engagement of said wedging surfaces when said key is in engagemnt with the other of said laterally facing abutments.

9. In a pusher for feeding stock, a shell, a bushing within the shell arranged to surround and resiliently grip stock to be fed, said bushing being arranged to collapse a limited amount when the stock is removed therefrom, a key carried by said bushing having a radially projecting end arranged to engage an abutment surface on said shell to limit relative movement of said bushing and shell in one direction, said key being rockably mounted on said bushing, and means normally urging one end of said key radially outward from the bushing.

10. In a pusher for feeding stock, a shell, a bushing within the shell arranged to surround and resiliently grip stock to be fed, said bushing being arranged to collapse a limited amount when the stock is removed therefrom, a key carried by said bushing having a radially projecting end arranged to engage an abutment surface on said shell to limit relative axial movement of said bushing and shell in one direction, said key being rockably mounted on said bushing, and spring means normally urging said projecting end of said key radially outward from the bushing into position to engage said abutment surface.

11. In a pusher for feeding stock, a shell, a bushing within the shell arranged to surround and resiliently grip stock to be fed, said bushing being arranged to collapse a limited amount when the stock is removed therefrom, a key carried by said bushing having a radially projecting portion arranged to engage an abutment surface on said shell to limit relative rotation of said bushing and shell, said key being rockably mounted on said bushing, and spring means normally urging said projecting portion of said key radially outward from the bushing.

12. In a pusher for feeding stock, a shell, a split bushing disposed within the shell, said bushing being arranged to be resiliently expanded by the insertion of stock to be fed, a key on said bushing having one end projecting radially therefrom and arranged to engage an abutment surface on said shell, said key being rockably mounted on said bushing, and a spring surrounding said bushing and urging the same to collapsed position, said spring passing over the other end of said key and resiliently urging said one end of said key radially outward.

13. In a pusher for feeding stock, a shell, a bushing within the shell arranged to resiliently grip the stock to be fed, a sleeve secured within said shell having a tapered internal opening and having a portion of its forward end formed as an abutment surface, said bushing having tapered surfaces arranged to engage the tapered opening in said sleeve to increase the grip of the bushing on the stock when the shell moves forwardly with respect to the bushing, and a radially projecting key on said bushing arranged to engage the abutment surface formed by said sleeve in certain relative angular positions of said bushing and shell to hold said tapered surfaces out of engagement, said key and abutment surfaces being spaced apart to permit engagement of said wedging surfaces in other angular positions of said bushing with respect to said shell.

14. In a pusher for automatic screw machines and the like, a pusher shell, a bushing within the shell arranged to resiliently grip the stock to be fed, cooperating wedging surfaces on the shell and bushing arranged to engage and increase the grip of the bushing on the stock when the shell moves forwardly, cooperating abutment surfaces on the shell and bushing arranged to engage and slide the bushing over the stock when the shell moves rearwardly, a forwardly facing abutment on said shell, a member having a rearwardly facing abutment mounted on the side of said bushing, and means resiliently urging said member radially outward into position for full engagement with said forwardly facing abutment, the rearwardly facing abutment of said member being adapted to be brought into engagement with said forwardly facing abutment by rotation of said bushing in said shell to prevent engagement of said wedging surfaces.

STODDARD B. MARTIN.